(12) United States Patent
Yamamoto et al.

(10) Patent No.: US 8,697,207 B2
(45) Date of Patent: Apr. 15, 2014

(54) HEAT SHRINKABLE POLYOLEFIN FILM AND PROCESS FOR PRODUCING THE SAME

(75) Inventors: Shigetomo Yamamoto, Inuyama (JP); Yukinobu Mukoyama, Ohtsu (JP); Kyoko Inagaki, Inuyama (JP); Kenji Kawai, Inuyama (JP); Masatoshi Hashimoto, Inuyama (JP); Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 499 days.

(21) Appl. No.: 12/520,193

(22) PCT Filed: Dec. 19, 2007

(86) PCT No.: PCT/JP2007/074399
§ 371 (c)(1),
(2), (4) Date: Jun. 19, 2009

(87) PCT Pub. No.: WO2008/075705
PCT Pub. Date: Jun. 26, 2008

(65) Prior Publication Data
US 2010/0093965 A1  Apr. 15, 2010

(30) Foreign Application Priority Data

Dec. 20, 2006 (JP) ................................. 2006-343171
Dec. 20, 2006 (JP) ................................. 2006-343172
Dec. 6, 2007 (JP) ................................. 2007-315497
Dec. 6, 2007 (JP) ................................. 2007-315498

(51) Int. Cl.
*C08F 210/06* (2006.01)
*B29C 55/14* (2006.01)

(52) U.S. Cl.
USPC .......... 428/34.9; 428/35.1; 428/483; 264/163; 526/348.1

(58) Field of Classification Search
None
See application file for complete search history.

(56) References Cited

U.S. PATENT DOCUMENTS

| 4,649,009 A | 3/1987 | Shibata et al. |
|---|---|---|
| 5,443,895 A | 8/1995 | Peiffer et al. |
| 5,614,315 A * | 3/1997 | Kondo et al. .................. 428/332 |

(Continued)

FOREIGN PATENT DOCUMENTS

| JP | 2000-038463 A | 2/2000 |
|---|---|---|
| JP | 2001-162725 A | 6/2001 |

(Continued)

OTHER PUBLICATIONS

Japanese Patent Office, International Search Report in International Patent Application No. PCT/JP2007/074399 (Mar. 18, 2008).

(Continued)

*Primary Examiner* — Alicia Chevalier
*Assistant Examiner* — Ronak Patel
(74) *Attorney, Agent, or Firm* — Leydig, Voit & Mayer, Ltd.

(57) ABSTRACT

The inventive heat-shrinkable polyolefin film is high in shrinkability in the longitudinal direction that is its main shrinkage direction and excellent in finish properties after shrinkage, perforated line openability, and thermal blocking resistance. The heat-shrinkable polyolefin film is characterized by particular values with respect to hot-water heat shrinkage ratio in the longitudinal and width directions, right angle tear strength in the width direction, and heat-resistant peel strength.

8 Claims, 1 Drawing Sheet

(56) References Cited

U.S. PATENT DOCUMENTS

| | | | |
|---|---|---|---|
| 2004/0072002 A1 | 4/2004 | Hashioka et al. | |
| 2006/0222874 A1* | 10/2006 | Umeda | 428/483 |
| 2007/0212539 A1 | 9/2007 | Yamada et al. | |
| 2008/0311320 A1* | 12/2008 | Hiruma et al. | 428/34.9 |
| 2009/0022916 A1* | 1/2009 | Yamada et al. | 428/34.9 |

FOREIGN PATENT DOCUMENTS

| | | |
|---|---|---|
| JP | 2004-074426 A | 3/2004 |
| JP | 2005-047959 A | 2/2005 |
| JP | 2005-068317 A | 2/2005 |
| JP | 2006-272775 A | 10/2006 |
| JP | 2008-173962 A | 7/2008 |
| WO | WO 2006075634 A1 * | 7/2006 ............. B29C 61/00 |
| WO | WO 2007063973 A1 * | 6/2007 |

OTHER PUBLICATIONS

Japanese Patent Office, International Written Opinion in International Patent Application No. PCT/JP2007/074399 (Mar. 18, 2008).
European Patent Office, Extended European Search Report in European Patent Application No. 07850869.4 (Feb. 28, 2011).
Japanese Patent Office, Notice of Reasons for Rejection in Japanese Patent Application No. 2007-315497 (May 7, 2013).
Korean Patent Office, Notice of Preliminary Rejection in Korean Patent Application No. 10-2009-7014727 (Oct. 4, 2013).
Taiwanese Patent Office, Notification for the Opinion of Examination in Taiwanese Patent Application No. 096148554 (Oct. 4, 2012).

* cited by examiner

HEAT SHRINKABLE POLYOLEFIN FILM AND PROCESS FOR PRODUCING THE SAME

TECHNICAL FIELD

The present invention relates to a heat-shrinkable polyolefin film and a manufacturing method thereof, specifically to a heat-shrinkable polyolefin film suitable for label applications and a manufacturing method thereof.

BACKGROUND ART

Recently, heat-shrinkable plastic films made from a variety of resins are widely used for applications such as external packaging for improving the appearance of packaged goods, packaging for avoiding direct collision of contents, and label packaging for both of a protection of glass bottles or plastic bottles and indication of commercial products. Among these heat-shrinkable plastic films, stretched films made from polyvinyl chloride resin, polystyrene resin, polyester resin, polyolefin resin, or the like are used for the purpose of labeling, cap sealing or assembling packaging in various containers such as polyethylene terephthalate (PET) containers, polyethylene containers, and glass containers.

However, although excellent in shrinkage characteristics, polyvinyl chloride films pose problems of, in addition to low heat resistance, generating a hydrogen chloride gas during incineration, generating dioxins, and the like. In addition, use of polyvinyl chloride resin films as shrinkable labels for PET containers and the like also causes a problem that a label has to be separated from a container upon recycling the container. On the other hand, although excellent in finished appearance after shrinkage, polystyrene films are poor in solvent resistance, and thus suffering a disadvantage that an ink of a special composition has to be used upon printing. Additionally, polystyrene films need to be incinerated at high temperature and cause a problem of generating a large amount of black smoke along with foul smells during incineration.

Therefore, polyester films and polyolefin films, which have high heat resistance, are easy to incinerate, and are excellent in solvent resistance, have been widely utilized as shrinkable labels. The amount of use of polyester films and polyolefin films tends to increase as the distribution amount of PET containers increases. Further, general heat-shrinkable polyester films and general heat-shrinkable polyolefin films that are stretched at a high ratio in the width direction and greatly shrunk in the width direction (namely, heat-shrinkable films whose main shrinkage direction is the width direction) are widely utilized (Patent Document 1).

Patent Document 1: Japanese Unexamined Patent Publication No. 2004-74426

DISCLOSURE OF THE INVENTION

Problems to be Solved by the Invention

However, the aforementioned heat-shrinkable polyester films and heat-shrinkable polyolefin films that are stretched in the width direction are poor in tear properties (so-called perforated line openability) when being torn along a perforated line orthogonal to the main shrinkage direction. Further, the aforementioned heat-shrinkable polyolefin films that are stretched in the width direction have insufficient heat resistance. Thus, when such heat-shrinkable polyolefin films are used as labels of bottles and the bottles are kept in a warmer, so-called blocking may occur, and thus the label of a bottle may be fused with the label of another bottle.

In addition, when a heat-shrinkable film that heat-shrinks in the width direction is attached as a label onto a bottle, a cylindrical body of the film should be formed such that the width direction of the film agrees with the circumferential direction of the bottle, should be attached onto the bottle by cutting the cylindrical body into pieces each having a predetermined length, and then should be heat-shrunk. Thus, it is difficult to attach a label, made from such a heat-shrinkable film, onto a bottle at a high speed. Further, in recent years, a wrapping method is developed that involves covering the circumference (opening) of a one side opened synthetic resin container, such as a lunch box, with a band-like film to keep the container enclosed. The aforementioned films that shrink in the width direction are unsuitable for such packaging applications.

An object of the present invention is to provide a heat-shrinkable polyolefin film that overcomes the problems of the above conventional heat-shrinkable polyester films and heat-shrinkable polyolefin films, has excellent shrinkability in the longitudinal direction that is the main shrinkage direction, also has excellent perforated line openability and excellent thermal blocking resistance, is attachable onto the circumference of a bottle directly from a film roll such that the main shrinkage direction agrees with the circumferential direction of the bottle, and is practical and suitable for the aforementioned novel wrapping applications.

Means for Solving the Problems

In the present inventions, an invention described in claim 1 is a heat-shrinkable polyolefin film formed in an elongated shape with a constant width from a polyolefin resin including a propylene-α-olefin copolymer as a principal component, a main shrinkage direction thereof being in a longitudinal direction. The heat-shrinkable polyolefin film meets the following requirements (1) to (4):

(1) the hot-water heat shrinkage ratio in the longitudinal direction is 15% or more and 40% or less when the film is treated in hot water at 90° C. for 10 seconds;

(2) the hot-water heat shrinkage ratio in the width direction orthogonal to the longitudinal direction is −5% or more and 10% or less when the film is treated in hot water at 90° C. for 10 seconds;

(3) the right angle tear strength in the width direction per unit thickness after the film is shrunk by 10% in the longitudinal direction in hot water at 80° C. is 50 N/mm or more and 200 N/mm or less; and (4) the peel strength is 0.1 N/15 mm or less when surfaces of two of the films are joined and a pressure of 0.4 MPa is applied to the films for 90 seconds while the films are heated at 90° C.

An invention described in claim 2 is characterized in that in the invention described in claim 1, the film meets the following requirement (5):

(5) the hot-water heat shrinkage ratio at a treatment temperature of 60° C. to 80° C. is 0% or less when the hot-water heat shrinkage ratio in the width direction is measured after the film is treated in hot water at a predetermined temperature for 10 seconds.

The hot-water heat shrinkage ratio at the treatment temperature of 60° C. to 80° C. being 0% or less, means that when the hot-water heat shrinkage ratio in the width direction is measured after the film is treated for 10 seconds in hot water adjusted at a temperature of 60° C. to 80° C., the hot-water heat shrinkage ratio is 0% or less (namely, the film does not shrink) at any temperature of hot water for treatment in the above range. A negative ratio of the hot-water heat shrinkage means extension of the film.

An invention described in claim 3 is characterized in that in the invention described in claim 1 or 2, the polyolefin resin includes, as a principal component, a copolymer of propylene and ethylene and the amount of ethylene in the resin is 2.0 mass % or more and 10.0 mass % or less.

An invention described in claim 4 is characterized in that in the invention described in claim 1 or 2, the polyolefin resin includes, as a principal component, a copolymer of propylene, ethylene and butene and the amount of ethylene and butene in the resin is 3.0 mass % or more and 10.0 mass % or less.

An invention described in claim 5 is characterized in that in the invention described in claim 1 or 2, the polyolefin resin includes, as a principal component, a copolymer of propylene and butene and the amount of butene in the resin is 15.0 mass % or more and 35.0 mass % or less.

An invention described in claim 6 is characterized in that in the invention described in any one of claims 1 to 5, the film has a lamination structure in which a skin layer is laminated on at least one surface of a core layer and an anti-blocking agent and/or an antistatic agent are added in the skin layer.

An invention described in claim 7 is a method for manufacturing a heat-shrinkable polyolefin film according to any one of claims 1 to 6. The method comprises the steps of: stretching an unstretched film at a ratio of 2.5 times or more and 8.0 times or less in the width direction at a temperature of 70° C. or higher and 140° C. or lower while holding both ends of the film in the width direction using clips within a tenter; performing a thermal treatment to the film at a temperature of 100° C. or higher and 155° C. or lower for a time period of 1.0 second or longer and 50.0 seconds or shorter; cutting and removing portions of the film at both ends in the width direction which are held by the clips; and stretching the film at a ratio of 2.0 times or more and 8.0 times or less in the longitudinal direction at a temperature of 70° C. or higher and 140° C. or lower.

An invention described in claim 8 is characterized in that in the invention described in claim 7, the stretching in the longitudinal direction is performed between a heated low-speed roll and a high-speed roll and the ratio of the stretching gap between these two rolls and the film width before stretching is adjusted so as to be 0.10 or more and 0.50 or less.

The stretching gap is the distance from the contact point between the low-speed roll and the film to the contact point between the high-speed roll and the film during the lengthwise stretching, and the ratio of the stretching gap and the film width before stretching is a value calculated as stretching gap/film width.

Effect of the Invention

The heat-shrinkable polyolefin film of the present invention has high shrinkability in the longitudinal direction that is its main shrinkage direction, and is excellent in perforated line openability in the direction orthogonal to the main shrinkage direction. Thus, the heat-shrinkable polyolefin film can be suitably used as a label of a container such as a bottle, can be attached onto a container very efficiently within a short time, shows a good finish with extremely few wrinkles and insufficient shrinkages when heat-shrunk after attachment, and also exhibits extremely excellent perforated line openability. In addition, when used as a label of a container such as a bottle, the heat-shrinkable polyolefin film has excellent thermal blocking resistance. Furthermore, the heat-shrinkable polyolefin film is suitable for the aforementioned novel wrapping applications.

Further, according to the method for manufacturing a heat-shrinkable polyolefin film of the present invention, a heat-shrinkable polyolefin film, which has high shrinkability in the longitudinal direction as described above and is excellent in finish properties after shrinkage, perforated line openability, and thermal blocking resistance, can be manufactured easily at a low cost.

BEST MODE FOR CARRYING OUT THE INVENTION

As an α-olefin copolymer component that is a copolymer of propylene and another α-olefin that is used in the present invention, an α-olefin with 2 to 8 carbon atoms is used, for example, ethylene, butene-1, and the like are preferable, and pentene-1, hexene-1,4-methyl-1-pentene, and the like can be used. In addition, the copolymer is preferably a random or block copolymer obtained by polymerization of propylene and one or more of the above α-olefins. Further, among these copolymers, a copolymer obtained by polymerization of propylene and ethylene, in which the amount of ethylene is 2.0 mass % or more and 10.0 mass % or less, a copolymer obtained by polymerization of propylene and butene, in which the amount of butene is 15.0 mass % or more and 35.0 mass % or less, a copolymer obtained by polymerization of propylene, ethylene, and butene, in which the amount of ethylene and butene is 3.0 mass % or more and 15.0 mass % or less are particularly preferable because excellent shrinkage characteristics are obtained when they are used.

Further, the melt flow rate (MFR) of the copolymer is preferably in a range from 0.1 to 100 g/10 min, more preferably in a range from 0.5 to 20 g/10 min, and particularly preferably in a range from 1.0 to 10 g/10 min. Further, the melting point of a resin used in the present invention is preferably 70° C. or higher and 150° C. or lower, more preferably 80° C. or higher and 145° C. or lower, and particularly preferably 90° C. or higher and 140° C. or lower. When the melting point exceeds 150° C., crystallinity becomes high and sufficient shrinkage characteristics are not obtained, which is not preferred. On the other hand, When the melting point becomes less than 70° C., stickiness and blocking occur in the resin and the resin becomes difficult to handle, which is not preferred.

In the present invention, according to need, various additives and fillers, such as a thermal stabilizer, an antioxidant, a light stabilizer, an antistatic agent, a lubricant, a nucleating agent, a fire retardant, a pigment, a dye, calcium carbonate, barium sulfate, magnesium hydroxide, mica, talc, clay, zinc oxide, magnesium oxide, aluminum oxide, an antibacterial agent, an anti-fog additive, an additive that provides natural degradability, and the like, can be added to a used resin as long as they do not impair the properties of the film. Particularly, in light of handleability and providing a lubricating property, an antistatic property, and thermal blocking resistance, an organic lubricant typified as fatty acid amides; a surfactant typified as fatty acid alkylamines, fatty acid alkylamine esters, and fatty acid monoglycerin esters; and an anti-blocking agent typified as silica, and PMMA are preferably added. In addition, another thermoplastic resin, a thermoplastic elastomer, rubbers, a hydrocarbon resin, a petroleum resin, and the like may be blended as long as they do not impair the properties of the film of the present invention.

Further, on a surface of the film of the present invention, a polypropylene resin layer of the same type; and another resin layer, for example, a gas barrier resin layer of an ethylene-vinyl acetate copolymer saponified product, a polyvinyl alcohol, or the like, may be laminated, as long as they do not impair the properties of the film.

The film of the present invention can be subjected to a surface treatment according to need as long as it does not impair the properties of the present invention. Examples of a method of the surface treatment include a corona discharge treatment, a plasma treatment, a flame treatment, an acid treatment, and the like, and there are no particular limitations on the method. A corona discharge treatment, a plasma treatment, and a flame treatment, which are capable of being continuously performed and can be easily performed prior to winding of a film during manufacturing, are preferably performed, and a corona discharge treatment is particularly preferable as a means for improving the wetting tension of a surface.

Further, when the heat-shrinkable polyolefin film of the present invention is treated in hot water at 90° C. for 10 seconds in an unloaded state, the heat shrinkage ratio (i.e., hot-water heat shrinkage ratio at 90° C.) of the film in the longitudinal direction, which is calculated by the following Equation 1 from the lengths before and after shrinkage, needs to be 15% or more and 40% or less.

Heat shrinkage ratio={(length before shrinkage−length after shrinkage)/length before shrinkage}×100(%)  Equation 1

When the hot-water heat shrinkage ratio in the longitudinal direction at 90° C. is less than 15%, the amount of shrinkage is small. Thus, wrinkles and sags occur in the label after heat shrinkage, which is not preferred. The lower limit of the hot-water heat shrinkage ratio in the longitudinal direction at 90° C. is preferably 18% or more, more preferably 21% or more, and particularly preferably 24% or more. In light of the essential properties of a polyolefin resin that includes, as a principal component, a propylene-α-olefin copolymer that is a raw material, the upper limit of the hot-water heat shrinkage ratio in the longitudinal direction at 90° C. is thought to be about 40%.

Further, when the heat-shrinkable polyolefin film of the present invention is treated in hot water at 90° C. for 10 seconds in an unloaded state, the heat shrinkage ratio of the film in the width direction, which is calculated by the above Equation 1 from the lengths before and after shrinkage, needs to be −5% or more and 10% or less.

When the hot-water heat shrinkage ratio in the width direction at 90° C. exceeds 10%, vertical shrinkage is liable to occur during heat shrinkage when the film is used as a label, which is not preferred. The lower limit of the hot-water heat shrinkage ratio in the width direction at 90° C. is preferably −3% or more, and more preferably −1% or more. The upper limit of the hot-water heat shrinkage ratio in the width direction at 90° C. is preferably 9% or less, more preferably 8% or less, and particularly preferably 7% or less. In light of the essential properties of the polyolefin resin that includes, as a principal component, a propylene-α-olefin copolymer that is a raw material, the lower limit of the hot-water heat shrinkage ratio in the width direction at 90° C. is thought to be about −5%.

Further, when the heat-shrinkable polyolefin film of the present invention is shrunk by 10% in hot water at 80° C. in the longitudinal direction and then the right angle tear strength in the width direction per unit thickness is evaluated by the following method, its right angle tear strength in the width direction needs to be 50 N/mm or more and 200 N/mm or less.

[Method of Measuring Right Angle Tear Strength]

After the film is shrunk by 10% in the longitudinal direction in hot water adjusted to 80° C., the film is sampled as a test piece of a predetermined size according to JIS-K-7128. Thereafter, both ends of the test piece are gripped with a universal tensile strength tester and then the strength at the tensile fracture in the width direction of the film is measured at a tension rate of 200 mm/minute. It is noted that for a film that is not shrunk by 10% at 80° C., the film is shrunk as much as possible by being immersed in hot water at 80° C. for about 5 seconds and the strength at the tensile fracture in the width direction of the film is measured. Then, the right angle tear strength per unit thickness is calculated by using the following Equation 2.

Right angle tear strength=strength at tensile fracture÷thickness  Equation 2

When the right angle tear strength after the film is shrunk by 10% in hot water at 80° C. in the longitudinal direction is less than 50 N/mm, there is the possibility that the film is easily torn by an impact due to falling during transportation when the film is used as a label, which is not preferred. On the other hand, when the right angle tear strength exceeds 200 N/mm, cuttability (easiness to tear) in an initial stage when the label is torn becomes defective, which is not preferred. The lower limit of the right angle tear strength is preferably 70 N/mm or more, more preferably 90 N/mm or more, and particularly preferably 110 N/mm or more. The upper limit of the right angle tear strength is preferably 180 N/mm or less, more preferably 160 N/mm or less, and particularly preferably 140 N/mm or less.

Regarding cuttability when a label is torn along a perforated line, it is thought that easiness to tear (easiness to put a notch) at the first portion (part of the upper or lower end of the label) of the perforated line as described above; and easiness to tear along the perforated line with a small force to the other end without tearing the label in a oblique direction with respect to the perforated line and cutting a tab (the balance between easinesses to tear in the perforated line direction and in the direction orthogonal to the perforated line direction), contribute to easiness of a work operation of actually manually peeling off the label. The latter easiness can slightly improve by modification of the pitch of the perforated line, and the like. The former easiness, which is the easiness to tear at the first portion of the perforated line, well corresponds to sensory evaluation when the label is actually manually torn, and is thought to be more important property. Therefore, the right angle tear strength of the heat-shrinkable polyolefin film of the present invention needs to be in the above range. However, the latter easiness, namely, the balance between easinesses to tear in the perforated line direction and in the direction orthogonal to the perforated line direction is preferably caused to be in a specific range because the perforated line openability of the heat-shrinkable polyolefin film of the present invention can improve. Specifically, when the heat-shrinkable polyolefin film of the present invention is shrunk by 10% in hot water at 80° C. in the longitudinal direction and then the Elmendorf tear loads in the longitudinal direction and the width direction are evaluated by the following method, the Elmendorf ratio that is the ratio of these Elmendorf tear loads is preferably 0.15 or more and 1.5 or less.

[Method of Measuring Elmendorf Ratio]

The film is attached to a rectangular frame having a predetermined length in a preliminarily loosened state (i.e., both ends of the film are held by the frame). Then, the film is shrunk by 10% in the longitudinal direction by being immersed in hot water at 80° C. for about 5 seconds until the loosened film comes into a state of tension in the frame (until the sag is removed). Thereafter, the Elmendorf tear loads in the longitudinal direction and the width direction of the film are measured according to JIS-K-7128 and then the Elmendorf ratio is calculated using the following Equation 3. It is noted that for a film that is not shrunk by 10% at 80° C., the film is shrunk as much as possible by being immersed in hot water at 80° C. for about 5 seconds and the Elmendorf tear loads in the longitudinal direction and the width direction of the film are measured.

$$\text{Elmendorf ratio} = \text{Elmendorf tear load in the longitudinal direction} \div \text{Elmendorf tear load in the width direction} \quad \text{Equation 3}$$

When the Elmendorf ratio is less than 0.15, the film is not easy to tear straight along the perforated line when used as a label, which is not preferred. On the other hand, when the Elmendorf ratio exceeds 1.5, the label is easy to tear at a position shifted from the perforated line, which is not preferred. The lower limit of the Elmendorf ratio is preferably 0.20 or more, more preferably 0.25 or more, and particularly preferably 0.3 or more. The upper limit of the Elmendorf ratio is preferably 1.4 or less, more preferably 1.3 or less, and particularly preferably 1.2 or less.

Further, when surfaces of two of the heat-shrinkable polyolefin films of the present invention are joined and a pressure of 0.4 MPa is applied to the films for 90 seconds while the films are heated at 90° C., the peel strength (hereinafter, referred to as heat-resistant peel strength) of the film needs to be 0.1 N/15 mm or less. The heat-resistant peel strength can be obtained by holding two overlapping films at both ends thereof with a universal tensile strength tester, and measuring the strength at a tension rate of 200 mm/minute when the two films are peeled from each other. When the heat-resistant peel strength exceeds 0.1 N/15 mm, there is the possibility that when the heat-shrinkable polyolefin film is used as a label, blocking occurs due to heat (e.g. by keeping a PET bottle covered with the label in a warmer), which is not preferred. The heat-resistant peel strength is preferably 0.05 N/15 mm or less, and most preferably 0 N/15 mm.

When the hot-water heat shrinkage ratio of the heat-shrinkable polyolefin film of the present invention in the width direction is measured after the film is treated in hot water at a predetermined temperature for 10 seconds, the hot-water heat shrinkage ratio at the treatment temperature of 60° C. to 80° C. is preferably 0% or less. When it is assumed that a finish is made to a film by passing the film through a steam tunnel, because the actual temperature of the film when passing through the steam tunnel is about 80° C., if the hot-water heat shrinkage ratio in the width direction at 80° C. is 0% or less, a problem such as vertical shrinkage, wrinkles, and the like is unlikely to occur, and the finish properties after shrinkage become desirable. In light of the essential properties of the polyolefin resin that includes, as a principal component, a propylene-α-olefin copolymer that is a raw material, the lower limit of the hot-water heat shrinkage ratio in the width direction at 80° C. is thought to be about −3%.

The above heat shrinkage ratio, the right angle tear strength, the Elmendorf ratio, the heat-resistant peel strength of the heat-shrinkable film can be attained by using the aforementioned preferred film composition in combination with a later-described preferred manufacturing method.

The thickness of the heat-shrinkable polyolefin film of the present invention is not particularly limited, 10 to 200 μm is preferable as a heat-shrinkable film for labels, and 20 to 100 μm is more preferable.

The heat-shrinkable polyolefin film of the present invention can be obtained by melt-extruding the aforementioned polyolefin resin material by an extruder to form an unstretched film and then biaxially stretching and heat-treating the unstretched film by the following methods.

When a raw material resin is melt-extruded, a polyolefin resin material is preferably dried using a dryer such as a hopper dryer or a paddle dryer or using a vacuum dryer. After the polyolefin resin material is dried in such a manner, the material is molten at a temperature of 200 to 300° C. and extruded in a film form using an extruder. Upon such extrusion, an existing arbitrary method such as a T-die method or a tubular method can be used.

Then, an unstretched film can be obtained by quenching the sheet-like molten resin after extrusion. As the method of quenching a molten resin, a method of casting a molten resin onto a revolving drum from a head and quenching and solidifying the resin to obtain a substantially unoriented resin sheet can be suitably used.

In addition, the resulting unstretched film is stretched in the width direction under predetermined conditions, as described below. Thereafter, the film is heat-treated once and then stretched in the longitudinal direction under predetermined conditions. The heat-shrinkable polyolefin film of the present invention can be obtained by quenching the film after the lengthwise stretching.

Upon the lengthwise stretching, the gap ratio (stretching gap/film width) can be adjusted in a range of 0.01 to 0.50 by appropriately adjusting a stretching gap (the distance from the contact point between a low-speed roll and the film to the contact point between a high-speed roll and the film during the lengthwise stretching) and the film width.

The following will describe in detail preferred biaxial stretching and heat treatment methods for obtaining the heat-shrinkable polyolefin film of the present invention, in consideration of the difference between the methods of the present invention and the conventional biaxial stretching and heat treatment methods for a heat-shrinkable polyolefin film.

[Preferred Film-Forming Method for the Heat-Shrinkable Polyolefin Film]

As described above, there is a drawback that a heat-shrinkable film stretched simply in the width direction has poor perforated line openability in the direction orthogonal to the main shrinkage direction. On the other hand, demands for heat-shrinkable films that shrink in the longitudinal direction have been high so far. However, a wide film cannot be manufactured only by stretching an unstretched film in the longitudinal direction. Thus, the productivity is poor and a film with a good thickness unevenness cannot be manufactured. Further, use of a method for stretching a film in the width direction in advance and then stretching the film in the longitudinal direction produces a film in which the amount of shrinkage in the longitudinal direction is insufficient or a film that needlessly shrinks in the width direction.

The present inventors have diligently studied, in the method of stretching a film in the width direction and then stretching the film in the longitudinal direction (hereinafter, referred to as the transverse-lengthwise stretching method), how the hot-water shrinkage ratio in the longitudinal direction, the perforated line openability, and the thermal blocking resistance of the film are changed depending on conditions in each stretching process. As a result, the present inventors have found that, during the manufacture of a film by the transverse-lengthwise stretching method, the amount of shrinkage in the longitudinal direction can be increased and the film with excellent perforated line openability in the orthogonal direction and excellent thermal blocking resistance can be stably manufactured by applying the following techniques. The present inventors have come to contrive the present invention on the basis of these findings.

(1) Intermediate thermal relaxation treatment after stretching in the width direction
(2) Trimming of the film edge prior to stretching in the longitudinal direction
(3) Adjustment of stretching gap The following will sequentially describe the above techniques.

(1) Intermediate Thermal Relaxation Treatment after Stretching in Width Direction The manufacturing of a film according to the transverse-lengthwise stretching method of the present invention requires stretching an unstretched film in the width direction and then heat-treating the film at a temperature of 100° C. to 155° C. for a period of 1.0 to 50.0 seconds (hereinafter, referred to as the intermediate thermal relaxation treatment). Conduct of such an intermediate thermal relaxation treatment makes it possible to obtain a film that has excellent perforated line cuttability and does not generate shrinkage unevenness when the film is made into a label. The reason why a film that has excellent perforated line cuttability and does not generate shrinkage unevenness can be obtained by conducting a specific intermediate thermal relaxation treatment after transverse stretching, is not clear. However, this is thought to be because the shrinkage stress in the width direction can be decreased while the molecular orientation in the width direction is made to remain to some extent by applying the specific intermediate thermal relaxation treatment. The lower limit of the thermal relaxation treatment temperature is preferably 110° C. or higher and more preferably 115° C. or higher. The upper limit of the thermal relaxation treatment temperature is preferably 150° C. or lower and more preferably 145° C. or lower. On the other hand, the time period for the thermal relaxation treatment needs to be controlled within the range from 1.0 to 50.0 seconds depending on the material composition.

The stretching in the width direction of an unstretched film needs to be executed while the both ends of the film in the width direction are held by clips in a tenter such that the temperature is 70° C. or higher and 140° C. or lower and the stretching ratio is 2.5 times or more and 8.0 times or less. When the stretching temperature falls below 70° C., rupture is liable to occur during stretching, which is not preferred. On the other hand, when the temperature exceeds 140° C., the thickness unevenness in the width direction deteriorates, which is not preferred. The lower limit of the transverse stretching temperature is preferably 75° C. or higher and more preferably 80° C. or higher. The upper limit of the transverse stretching temperature is preferably 135° C. or lower and more preferably 130° C. or lower. When the stretching ratio in the width direction falls below 2.5 times, not only the productivity is poor but also the thickness unevenness in the width direction deteriorates, which is not preferred. On the other hand, when the stretching ratio exceeds 8.0 times, rupture is liable to occur during stretching and also a large energy and a large scale device are required for thermal relaxation, and thus the productivity deteriorates, which is not preferred. In addition, the lower limit of the transverse stretching ratio is preferably 3.0 times or more and more preferably 3.5 times or more. The upper limit of the transverse stretching ratio is 7.5 times or less and more preferably 7.0 times or less.

(2) Trimming of Film Edge Prior to Stretching in Longitudinal Direction.

In the manufacture of a film by the transverse-lengthwise stretching method of the present invention, before the film having been subjected to the intermediate thermal relaxation treatment is stretched in the longitudinal direction, a thick portion (mainly, a clip gripping portion during transverse stretching) of the film at the film edge that has not been sufficiently and transversely stretched needs to be trimmed. Specifically, thick portions, located on right and left edges of the film, with a thickness of about 1.1 to 1.3 times that of the central portion need to be cut and removed using a tool such as a cutter, and only the remaining portion needs to be stretched in the longitudinal direction. When the film edge is trimmed as described above, a film before being subjected to trimming is preferably cooled in advance such that the surface temperature of the film is 50° C. or lower. Cooling the film in such a manner makes it possible to trim the cutting face without disturbance. Moreover, although the film edge can be trimmed using a usual cutter or the like, use of a round blade having a circular cutting edge permits the film edge to be sharply and continuously cut over a long period of time without partially dulling the cutting edge. This causes no induction of rupture during stretching in the longitudinal direction and thus is preferable.

Trimming of the film edge prior to stretching in the longitudinal direction in such a way makes it possible to uniformly stretch a film, which has been once subjected to a thermal relaxation treatment, in the longitudinal direction. Now, for the first time, a continuous stable production of a film without rupture becomes possible. Additionally, it becomes possible to obtain a film with a large amount of shrinkage in the longitudinal direction (main shrinkage direction). Furthermore, uniform stretching of a film in the longitudinal direction is possible, so that a film having a small thickness unevenness in the longitudinal direction can be obtained. In addition, the trimming of the film edge allows bowing during stretching in the longitudinal direction to be avoided, thereby obtaining a film exhibiting a small physical property difference between its right and left portions.

(3) Adjustment of Stretching Gap

In the manufacture of a film by the transverse-lengthwise stretching method of the present invention, the above stretching in the longitudinal direction after the intermediate thermal relaxation treatment is performed between a heated low-speed roll and a high-speed roll, and the ratio (hereinafter, referred to as stretching gap ratio) of the stretching gap between these rolls and the film width before stretching needs to be 0.01 or more and 0.50 or less. The stretching gap ratio is more preferably 0.10 or more and 0.50 or less. By adjusting so, shrinkage does not occur in the direction orthogonal to the main shrinkage direction when the film is attached as a label onto a bottle. Thus, so-called "vertical shrinkage" does not occur, the finish properties after shrinkage are desirable, and a heat-shrinkable film with excellent perforated line openability and excellent thermal blocking resistance can be obtained. When the stretching gap ratio is less than 0.10, vertical shrinkage is liable to occur when the film is attached as a label onto a bottle, which is not preferred. On the other hand, when the stretching gap ratio exceeds 0.50, unevenness in stretching occurs and thickness unevenness deteriorates, which is not preferred.

It is thought that only one of the techniques (1) to (3) described above does not effectively contribute to the heat shrinkability in the longitudinal direction, the perforated line openability, the thermal blocking resistance, and the stable film formability of the film, and the use of the combination of the techniques (1) and (2) or the techniques (1) to (3) makes it possible to very effectively exhibit excellent heat shrinkability in the longitudinal direction, excellent perforated line openability, excellent thermal blocking resistance, and excellent stable film formability of the film.

EXAMPLES

Hereinafter, the present invention will be described in more detail by way of examples; however, the invention is by no means limited to aspects of such examples and can be properly modified within the invention. The properties and compositions of materials used in Examples and Comparative Examples, and the manufacturing conditions of the films (stretching and thermal relaxation treatment conditions and the like) in Examples and Comparative Examples are each shown in Tables 1 to 4. The resin materials A to E in Tables 1 and 2 are as follows.

Resin material A: a polypropylene-ethylene random copolymer (S131 manufactured by Sumitomo Chemical Co., Ltd., ethylene=5.5 mass %, MFR=1.2 g/10 min, the melting point: 135° C.)

Resin material B: one obtained by adding 6 mass % of a stearic acid monoglycerin ester (antistatic agent) to 94 mass % of a polypropylene-ethylene random copolymer (FS2011DG3 manufactured by Sumitomo Chemical Co., Ltd., ethylene=0.6 mass %, MFR=2.5 g/10 min, the melting point: 158° C.)

Resin material C: one obtained by adding 20 mass % of organic polymer fine particles (CS30 manufactured by Sumitomo Chemical Co., Ltd., the average particle diameter: 3.5 μm) to 80 mass % of a polypropylene-ethylene random copolymer (FS2011DG3 manufactured by Sumitomo Chemical Co., Ltd., ethylene=0.6 mass %, MFR=2.5 g/10 min, the melting point: 158° C.)

Resin material D: a polypropylene-ethylene random copolymer (FS2011DG3 manufactured by Sumitomo Chemical Co., Ltd., ethylene=0.6 mass %, MFR=2.5 g/10 min, the melting point: 158° C.)

Resin material E: a polypropylene-ethylene-butene random copolymer (FSX66E8 manufactured by Sumitomo Chemical Co., Ltd., ethylene=2.5 mass %, butene=6.9 mass %, MFR=3.0 g/10 min, the melting point: 134° C.)

TABLE 1

| | Composition of resin material (mass %) | | | |
|---|---|---|---|---|
| | Skin layer | Core layer | Ethylene amount (%) | Butene amount (%) |
| Example 1 | A/B/C = 90/8/2 | A = 100 | 5.35 | — |
| Example 2 | A/B/C = 90/8/2 | A = 100 | 5.35 | — |
| Example 3 | A/B/C = 90/8/2 | A = 100 | 5.35 | — |
| Example 4 | A/B/C = 90/8/2 | A = 100 | 5.35 | — |
| Example 5 | A/B/C = 90/8/2 | E = 100 | 3.34 | 4.62 |
| Example 6 | A/B/C = 90/8/2 | A = 100 | 5.35 | — |
| Example 7 | — | A/B/C = 90/8/2 | 5.05 | — |
| Comparative Example 1 | A/B/C = 90/8/2 | A = 100 | 5.35 | — |
| Comparative Example 2 | A/B/C = 90/8/2 | A = 100 | 5.35 | — |
| Comparative Example 3 | B/C/D = 8/2/90 | D = 100 | 0.6 | — |
| Comparative Example 4 | B/C/D = 8/2/90 | D = 100 | 0.6 | — |

Resin material A: a polypropylene-ethylene random copolymer (ethylene = 5.5 mass %)
Resin material B: one obtained by adding 6 mass % of a stearic acid monoglycerin ester to 94 mass % of a polypropylene-ethylene random copolymer (ethylene = 0.6 mass %)
Resin material C: one obtained by adding 20 mass % of organic polymer fine particles to 80 mass % of a polypropylene-ethylene random copolymer (ethylene = 0.6 mass %)
Resin material D: a polypropylene-ethylene random copolymer (ethylene = 0.6 mass %)
Resin material E: a polypropylene-ethylene-butene random copolymer (ethylene = 2.5 mass %, butene = 6.9 mass %)

TABLE 2

| | Composition of resin material (mass %) | | | |
|---|---|---|---|---|
| | Skin layer | Core layer | Ethylene amount (%) | Butene amount (%) |
| Example 8 | A/B/C = 90/8/2 | A = 100 | 5.35 | — |
| Example 9 | A/B/C = 90/8/2 | E = 100 | 3.34 | 4.62 |
| Example 10 | A/B/C = 90/8/2 | A = 100 | 5.35 | — |
| Example 11 | A/B/C = 90/8/2 | A = 100 | 5.35 | — |
| Example 12 | — | A/B/C = 90/8/2 | 5.05 | — |
| Comparative Example 5 | A/B/C = 90/8/2 | A = 100 | 5.35 | — |
| Comparative Example 6 | B/C/D = 8/2/90 | D = 100 | 0.6 | — |
| Comparative Example 7 | B/C/D = 8/2/90 | D = 100 | 0.6 | — |
| Comparative Example 8 | A/B/C = 90/8/2 | A = 100 | 5.35 | — |

Resin material A: a polypropylene-ethylene random copolymer (ethylene = 5.5 mass %)
Resin material B: one obtained by adding 6 mass % of a stearic acid monoglycerin ester to 94 mass % of a polypropylene-ethylene random copolymer (ethylene = 0.6 mass %)
Resin material C: one obtained by adding 20 mass % of organic polymer fine particles to 80 mass % of a polypropylene-ethylene random copolymer (ethylene = 0.6 mass %)
Resin material D: a polypropylene-ethylene random copolymer (ethylene = 0.6 mass %)
Resin material E: a polypropylene-ethylene-butene random copolymer (ethylene = 2.5 mass %, butene = 6.9 mass %)

TABLE 3

| | | Stretching conditions | | | | | | | |
|---|---|---|---|---|---|---|---|---|---|
| | | Transverse stretching | | Intermediate thermal relaxation treatment | | | Lengthwise stretching | | |
| | | | | | | | Low-speed | High-speed | |
| | Stretching method | Temperature (° C.) | Ratio | Temperature (° C.) | Time (sec) | Temperature (° C.) | roll speed (m/min) | roll speed (m/min) | Ratio |
| Example 1 | Transverse-Lengthwise | 89 | 4.5 | 145 | 43 | 100 | 3.0 | 6.0 | 2.0 |
| Example 2 | Transverse-Lengthwise | 89 | 4.5 | 145 | 43 | 110 | 3.0 | 6.0 | 2.0 |

TABLE 3-continued

| | | Stretching conditions | | | | | | | |
|---|---|---|---|---|---|---|---|---|---|
| | | Transverse stretching | | Intermediate thermal relaxation treatment | | Lengthwise stretching | | | |
| | | | | | | | Low-speed roll speed | High-speed roll speed | |
| | Stretching method | Temperature (° C.) | Ratio | Temperature (° C.) | Time (sec) | Temperature (° C.) | (m/min) | (m/min) | Ratio |
| Example 3 | Transverse-Lengthwise | 89 | 4.5 | 145 | 43 | 110 | 3.0 | 15.0 | 5.0 |
| Example 4 | Transverse-Lengthwise | 89 | 4.5 | 145 | 43 | 120 | 3.0 | 10.5 | 3.5 |
| Example 5 | Transverse-Lengthwise | 89 | 4.5 | 145 | 43 | 120 | 3.0 | 10.5 | 3.5 |
| Example 6 | Transverse-Lengthwise | 89 | 4.5 | 145 | 43 | 120 | 3.0 | 9.0 | 3.0 |
| Example 7 | Transverse-Lengthwise | 89 | 4.5 | 145 | 43 | 120 | 3.0 | 10.5 | 3.5 |
| Comparative Example 1 | Transverse | 89 | 4.5 | 70 | 43 | — | — | — | — |
| Comparative Example 2 | Lengthwise | — | — | — | — | 90 | 1.0 | 6.0 | 6.0 |
| Comparative Example 3 | Transverse | 89 | 4.5 | 145 | 43 | — | — | — | — |
| Comparative Example 4 | Transverse-Lengthwise | 165 | 4.5 | 160 | 43 | 140 | 3.0 | 10.5 | 3.5 |

TABLE 4

| | | Stretching conditions | | | | | | | | |
|---|---|---|---|---|---|---|---|---|---|---|
| | | Transverse stretching | | Intermediate thermal relaxation treatment | | Lengthwise stretching | | | | |
| | | | | | | | Low-speed roll speed | High-speed roll speed | | |
| | Stretching method | Temperature (° C.) | Ratio | Temperature (° C.) | Time (sec) | Temperature (° C.) | (m/min) | (m/min) | Ratio | Stretching gap ratio |
| Example 8 | Transverse-Lengthwise | 89 | 6.5 | 130 | 43 | 90 | 1.0 | 6.0 | 6.0 | 0.23 |
| Example 9 | Transverse-Lengthwise | 89 | 6.5 | 130 | 43 | 90 | 1.0 | 6.0 | 6.0 | 0.23 |
| Example 10 | Transverse-Lengthwise | 89 | 6.5 | 130 | 43 | 90 | 1.5 | 9.0 | 6.0 | 0.23 |
| Example 11 | Transverse-Lengthwise | 89 | 6.5 | 130 | 43 | 90 | 2.0 | 9.0 | 4.5 | 0.23 |
| Example 12 | Transverse-Lengthwise | 89 | 6.5 | 130 | 43 | 90 | 1.0 | 6.0 | 6.0 | 0.23 |
| Comparative Example 5 | Lengthwise | — | — | — | — | 90 | 1.0 | 6.0 | 6.0 | 0.23 |
| Comparative Example 6 | Transverse-Lengthwise | 89 | 6.5 | 130 | 43 | — | — | — | — | — |
| Comparative Example 7 | Transverse-Lengthwise | 165 | 6.5 | 160 | 43 | 140 | 1.0 | 6.0 | 6.0 | 0.23 |
| Comparative Example 8 | Transverse-Lengthwise | 89 | 6.5 | 130 | 43 | 120 | 2.0 | 8.0 | 4.0 | 0.06 |

The evaluation methods of films are as follows.

[Tm (Melting Point)]

Tm was obtained from the peak temperature of an endothermic curve when 5 mg of an unstretched film was collected and heated from room temperature at a temperature rising rate of 10° C./minute using a differential scanning calorimeter manufactured by Seiko Instruments Inc. (Model: DSC 220).

[Ethylene Content and Butene Content]

The ethylene content and the butene content in the propylene-ethylene copolymer, the propylene-butene copolymer, and the propylene-ethylene-butene copolymer were determined by the method described in P615-617 of the "Polymer Analysis Handbook" (published by KINOKUNIYA COMPANY LTD. in 1995), namely, the 13C-NMR spectrum method. It is noted that the content can be also determined by the method described at "(i) Random Copolymer" in P256 of this book.

[Heat Shrinkage Ratio (Hot-Water Heat Shrinkage Ratio)]

A film was cut into a square of 10 cm×10 cm, and treated and heat-shrunk in hot water at a predetermined temperature (60° C., 65° C., 70° C., 75° C., 80° C., 90° C.) of ±0.5° C. for 10 seconds in an unloaded state. Thereafter, the dimensions of the film in the lengthwise and transverse directions were measured and then each heat shrinkage ratio was calculated according to the above Equation 1. The direction (longitudinal direction) in which the heat shrinkage ratio is larger was taken as the main shrinkage direction.

[Heat-Resistant Peel Strength]

Two resulting film samples were prepared, surfaces of these samples were joined, and a pressure of 0.4 MPa was applied to these samples for 90 seconds by a test sealer (manufactured by NISHIBE KIKAI CO., LTD., the seal bar width: 10 mm) while these samples were heated at 90° C. Then, the overlapped two films were cut into a strip with a width of 15 mm. Thereafter, the peel strength was measured when the two films were peeled from each other at a peeling rate of 200 mm/minute using a universal tensile strength tester (autograph manufactured by Shimadzu Corporation). The measurement was conducted 5 times, and the average value was calculated.

[Right Angle Tear Strength]

Figure 1:
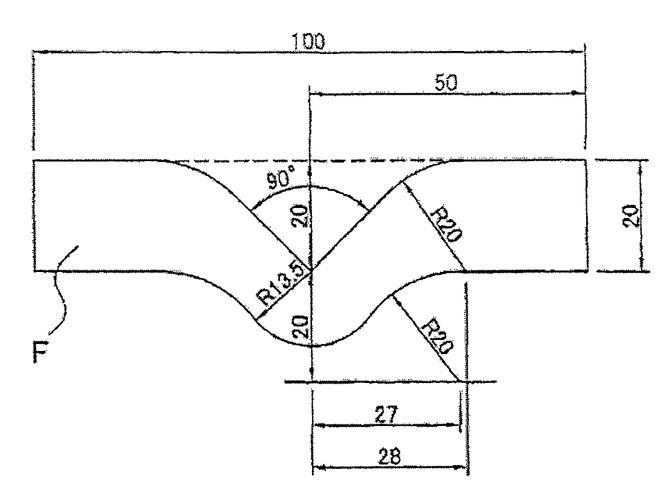
FIG. 1 is an explanatory view showing a shape of a test piece in the measurement of right angle tear strength (wherein, the unit of length in the drawing for each portion of the test piece is mm).

A film was shrunk by 10% in the main shrinkage direction in hot water adjusted to 80° C. For a film that was not shrunk by 10% at 80° C., the film was shrunk as much as possible by being immersed at 80° C. for about 5 seconds. Thereafter, a test piece was made by sampling the film into a shape shown in FIG. 1 according to JIS-K-7128 (in sampling, the longitudinal direction of the test piece was taken as the main shrinkage direction of the film). Thereafter, both ends of the test piece were gripped with a universal tensile strength tester (autograph manufactured by Shimadzu Corporation), the strength at the tensile fracture in the width direction of the film was measured at a tensile rate of 200 mm/minute, and then the right angle tear strength per unit thickness was calculated using the above Equation 2.

[Elmendorf Ratio]

The resulting film was attached to a rectangular frame while having been loosened in advance (both ends of the film were held by the frame). Then, the film was shrunk by 10% in the main shrinkage direction (hereinafter, referred to as preliminary shrinkage) by being immersed in hot water at 80° C. for about 5 seconds until the loosened film came into a state of tension in the frame (until the sag was removed). For a film that was not shrunk by 10% at 80° C., the film was shrunk as much as possible by being immersed at 80° C. for about 5 seconds. Thereafter, according to JIS-K-7128, the film was cut into a size of main shrinkage direction×orthogonal direction=63 mm×75 mm and a test piece was prepared by making a slit of 20 mm (depth of cut) at the center of a long edge (edge along the main shrinkage direction) so as to be orthogonal to the edge. Then, the Elmendorf tear load in the main shrinkage direction was measured using the test piece fabricated. In addition, the film was preliminarily shrunk in the main shrinkage direction by the same method as above. Thereafter, a test piece was prepared such that the main shrinkage direction of the film and the orthogonal direction of the film were interchanged, and the Elmendorf tear load in the orthogonal direction was measured. Then, the Elmendorf ratio was calculated by using the above Equation 3 from the resulting Elmendorf tear loads in the main shrinkage direction and the direction orthogonal to the main shrinkage direction.

[Finish Properties after Shrinkage]

For film rolls whose main shrinkage direction was the longitudinal direction, a resulting film roll was slit with a width of about 120 mm, cut with a predetermined length, and wound to produce small-size slit rolls. Printing for labels (three-color printing) was repeatedly applied in advance to the slit rolls with dark green, gold and white inks manufactured by Toyo Ink Mfg. Co., Ltd. In each portion printed for a label, two perforated lines (in which circles with a diameter of about 1 mm were arranged at intervals of about 1 mm) are formed across the entire film width at an interval of about 22 mm in the direction orthogonal to the longitudinal direction of the film roll. An end of the rolled film that has been subjected to printing for labels was bonded to a part of the outer circumference of a 350 ml square PET bottle (filled with a content) for hot beverage by putting the end on an adhesive applied to the part of the outer circumference of the bottle. In this state, the roll film was drawn for a predetermined length, and wound around the outer circumference of the PET bottle. Thereafter, portions of the heat-shrinkable film that overlapped with each other on the outer circumference of the PET bottle were bonded to each other by the adhesive, and the outer film was cut by a cutter in the vertical direction, thereby covering the outer circumference of the PET bottle with a label.

For film rolls whose main shrinkage direction was the width direction, three-color printing was applied in advance to a heat-shrinkable film with dark green, gold and white inks manufactured by Toyo Ink Mfg. Co., Ltd. Then, a cylindrical label was produced by heat-sealing both ends of the printed film with a Hakko sealer (model No. 310-1) manufactured by Hakko Corporation. Thereafter, the produced label was attached onto the circumference of a PET bottle.

The attaching of the label was completed by passing a PET bottle covered with a label (a PET bottle covered with a label formed from a film whose longitudinal direction was main shrinkage direction, and a PET bottle covered with a label formed from a film whose width direction was main shrinkage direction) through a steam tunnel (model: SH-1500-L) manufactured by Fuji Astec Inc., for 10 seconds at a zone temperature of 80° C. to heat-shrink the label around the outer circumference of the PET bottle. Upon attachment, in the neck portion, a portion with a diameter of 40 mm was adjusted so as to become one end of the label. Finish properties after shrinkage were visually evaluated, and the criteria were as follows.

Excellent: No wrinkles, jumping up, and insufficient shrinkage occurred and no colored spots were seen as well.

Good: No wrinkles, jumping up, or insufficient shrinkage were confirmed, but some colored spots were seen.

Fair: No jumping up and insufficient shrinkage occurred, but unevenness in the neck portion was seen.

Poor: Wrinkles, jumping up, and insufficient shrinkage occurred.

[Perforated Line Openability]

A label provided in advance with a perforated line in the direction orthogonal to the main shrinkage direction was attached onto a PET bottle under the same conditions as the measurement conditions of the finish properties after shrinkage as described above. Here, the two perforated lines were formed by punching holes with a length of 1 mm at intervals of 1 mm, and provided at an interval of 22 mm and for a length of 120 mm in the vertical direction (direction of height) of the label. Thereafter, this bottle was refrigerated at 5° C., and then the perforated line of the label of the bottle immediately after being taken out from the refrigerator was torn with the tips of fingers. The number of bottles of which the labels were successfully torn along the perforated lines in the vertical direction and peeled off the bottles was counted. The ratio (%) of the number of bottles to the total sample number of 50 was calculated.

[Thermal Blocking Resistance]

By the same method as that for evaluation of finish properties after shrinkage, a heat-shrinkable film was heat-shrunk and attached onto the outer circumference of a 350 ml square PET bottle (filled with a content) for hot beverage. Then, 5 PET bottles onto which heat-shrinkable films were similarly attached were vertically stacked, and kept at 70° C. for 5 days. Then, a sensory evaluation was made in the following two levels about whether or not there was blocking between the films of the PET bottles (note that when slight blocking was confirmed, it was evaluated as poor).

Good: There was no blocking.
Poor: There was blocking.

Example 1

By using a co-extrusion method, polyolefin resins were melt-extruded (laminated in a die and extruded) from two extruders (first and second extruders), and wound around a rotating metal roll cooled at 30° C. so as to be quenched, resulting in an unstretched film (polyolefin resin lamination sheet) of a two-type and three-layer structure with a thickness of 400 μm. The take-off speed (rotational speed of the metal roll) of the unstretched film at this time was about 6.8 m/min. A method (processes until melt extrusion) of forming each layer of the unstretched film was as follows. In the following description, the three layers are called a first layer, a second layer, and a third layer, respectively, in order from the surface layer of the polyolefin resin lamination sheet (namely, a surface of the third layer is a metal roll contact surface). The extruding amounts of the first and second extruders during formation of the unstretched film were adjusted such that the thicknesses ratio of first layer/second layer/third layer becomes 1/4/1.

Formation of First Layer and Third Layer (Skin Layer)

The above dried resin materials A, B, and C were continuously and individually fed to the hopper of the extruder (the first extruder) by a metering screw feeder. The fed amount of the resin material A was 90 mass %, the fed amount of the resin material B was 8 mass %, and the fed amount of the resin material C was 2 mass %. Then, the fed resin materials A, B, and C were mixed in the hopper, and melt-extruded from a T die at 250° C. by the uniaxial first extruder.

Formation of Second Layer (Core Layer)

The above dried resin material A was continuously fed to the hopper of the extruder (the second extruder) by a metering screw feeder. Then, the fed resin material A was melt-extruded from a T die at 250° C. by the uniaxial second extruder.

Thereafter, the resulting unstretched film was led to a tenter in which a transverse stretching zone, an intermediate zone, and an intermediate thermal relaxation treatment zone were continuously disposed. In the tenter, the length of the intermediate zone located intermediately between the transverse stretching zone and the intermediate thermal relaxation treatment zone was set at about 40 cm. Additionally, in the intermediate zone, when a strip of paper was hung down in a state where a film did not pass therethrough, hot air from the stretching zone and hot air from the thermal treatment zone were interrupted such that the paper strip hung down almost completely in the lengthwise direction.

Then, the unstretched film led to the tenter was preliminary heated until the temperature of the film became 89° C. Thereafter, the film was stretched to 4.5 times its original length at 89° C. in the transverse direction in the transverse stretching zone and passed through the intermediate zone. Then, the film was led to the intermediate thermal relaxation treatment zone and heat-treated at a temperature of 145° C. for 43 seconds, resulting in a transverse uniaxially stretched film with a thickness of 90 μm. Subsequently, one pair of trimming devices (including a round blade having a circular cutting edge) disposed on right and left sides behind the tenter were utilized to cut an edge area of the transverse uniaxially stretched film (portion with a thickness of about 1.2 times that of the center of the film) and to continuously remove the edge portions of the film positioned outside the cut portion.

Furthermore, the film (film width=500 mm) whose edges were trimmed in such a manner was led to a lengthwise stretching machine in which a plurality of roll groups were continuously arranged, and was preliminarily heated on a preheat roll until the film temperature became 90° C. Then, the film was stretched to 2.0 times its original length between a low-speed stretching roll set at a surface temperature of 100° C. and a high-speed stretching roll in which circulating water was set at a temperature of 30° C. The speed of the low-speed roll (the speed of the film moving together with the low-speed roll) was adjusted at 3.0 m/min, and the speed of high-speed roll (the speed of the film moving together with the high-speed roll) was adjusted at 6.0 m/min. The stretching gap between the low-speed stretching roll and the high-speed stretching roll was adjusted at 30 mm (stretching gap ratio=0.06).

Then, the film after being stretched as described above was reeled around a paper tube, thereby obtaining a film roll in which a biaxially stretched film (heat-shrinkable polyolefin film) with a thickness of about 50 μm was wound for a predetermined length. Subsequently, the properties of the resulting film were evaluated by the methods as described above. The evaluation results are shown in Table 5.

Example 2

A film roll in which a heat-shrinkable film was wound was obtained by the same method as that of Example 1, except that the surface temperature of the low-speed stretching roll during lengthwise stretching was set at 110° C. Then, the properties of the resulting film were evaluated by the same methods as that of Example 1. The evaluation results are shown in Table 5.

Example 3

A film roll in which a heat-shrinkable film with a thickness of about 20 μm was wound was obtained by the same method as that of Example 2, except that the speed of the high-speed roll during lengthwise stretching was adjusted at 15.0 m/min (lengthwise stretching ratio=5.0 times). Then, the properties of the resulting film were evaluated by the same methods as that of Example 1. The evaluation results are shown in Table 5.

Example 4

A film roll in which a heat-shrinkable film with a thickness of about 30 μm was wound was obtained by the same method as that of Example 1, except that the surface temperature of the low-speed stretching roll during lengthwise stretching was set at 110° C. and the speed of the high-speed roll during lengthwise stretching was adjusted at 10.5 m/min (lengthwise stretching ratio=3.5 times). Then, the properties of the resulting film were evaluated by the same methods as that of Example 1. The evaluation results are shown in Table 5.

Example 5

A film roll in which a heat-shrinkable film was wound was obtained by the same method as that of Example 4, except that the resin material for forming the core layer was changed to the resin material E. Then, the properties of the resulting film were evaluated by the same methods as that of Example 1. The evaluation results are shown in Table 5.

Example 6

A film roll in which a heat-shrinkable film with a thickness of about 36 μm was wound was obtained by the same method as that of Example 4, except that the speed of the high-speed roll during lengthwise stretching was adjusted at 9.0 m/min (lengthwise stretching ratio=3.0 times). Then, the properties of the resulting film were evaluated by the same methods as that of Example 1. The evaluation results are shown in Table 5.

Example 7

A film roll in which a heat-shrinkable film with a thickness of about 30 μm was wound was obtained by the same method as that of Example 4, except that when an unstretched resin sheet was formed, the resin material fed to the second extruder was changed as described in Table 1 and a single-layer structure of only a second layer was provided without forming a first layer and a third layer. Then, the properties of the resulting film were evaluated by the same methods as that of Example 1. The evaluation results are shown in Table 5.

Comparative Example 1

A film roll in which a heat-shrinkable film with a thickness of about 24 μm was wound was obtained by the same method as that of Example 1, except that the thickness of the unstretched film of the two-type and three-layer structure was 110 μm and the temperature for the intermediate thermal relaxation treatment was 70° C. Then, the properties of the resulting film were evaluated by the same methods as that of Example 1. The evaluation results are shown in Table 5.

Comparative Example 2

A film roll in which a heat-shrinkable film with a thickness of about 20 μm was wound was obtained by the same method as that of Example 1, except that the thickness of the unstretched film of the two-type and three-layer structure was 110 μm, the unstretched film was led to the lengthwise stretching machine without performing the transverse stretching and the intermediate thermal relaxation treatment, the speed of the low-speed roll during lengthwise stretching was changed to 1.0 m/min, and the speed of the high-speed roll during lengthwise stretching was changed to 6.0 m/min (lengthwise stretching ratio=6.0 times). Then, the properties of the resulting film were evaluated by the same methods as that of Example 1. The evaluation results are shown in Table 5.

Comparative Example 3

A film roll in which a heat-shrinkable film was wound was attempted to be obtained by the same method as that of Example 1, except that the resin materials for forming the skin layer and the core layer and their compositions were changed as described in Table 1 and the lengthwise stretching was not performed. However, rupture occurred frequently during the transverse stretching process, and thus a film that could be evaluated could not be obtained.

Comparative Example 4

A film roll in which a heat-shrinkable film with a thickness of about 30 μm was wound was obtained by the same method as that of Example 4, except that the resin materials for forming the skin layer and the core layer and their compositions were changed as described in Table 1, the temperature for the intermediate thermal relaxation treatment was changed to 160° C., and the temperature of the low-speed roll during lengthwise stretching was changed to 140° C. Then, the properties of the resulting film were evaluated by the same methods as that of Example 1. The evaluation results are shown in Table 5.

TABLE 5

Properties of heat-shrinkable film

| | 90° C. hot-water shrinkage ratio (%) | | Right angle tear strength (N/mm) | Elmendorf tear load (mN) | | | Heat-resistant peel strength (N/15 mm) | Perforated line openability (failure ratio) (%) | Shrinkage unevenness | Thermal blocking resistance |
|---|---|---|---|---|---|---|---|---|---|---|
| | Main shrinkage direction | Orthogonal direction* | | Main shrinkage direction | Orthogonal direction* | Elmendorf ratio | | | | |
| Example 1 | 34 | −0.5 | 193 | 514.9 | 107.9 | 4.77 | 0.04 | 8 | Excellent | Good |
| Example 2 | 25.3 | 0 | 189.7 | 441.3 | 107.9 | 4.09 | 0.05 | 10 | Excellent | Good |
| Example 3 | 23.8 | 7 | 176.9 | 53.9 | 147.1 | 0.37 | 0.04 | 8 | Excellent | Good |
| Example 4 | 22.5 | 2.5 | 171.7 | 76.8 | 78.5 | 0.98 | 0.04 | 4 | Excellent | Good |
| Example 5 | 25 | 3.5 | 152.5 | 70.1 | 72.3 | 0.97 | 0.04 | 6 | Excellent | Good |
| Example 6 | 21 | 3 | 155.6 | 105.8 | 106.1 | 1.00 | 0.04 | 2 | Excellent | Good |
| Example 7 | 22 | 2.3 | 150.2 | 75.2 | 76.3 | 0.99 | 0.05 | 4 | Excellent | Good |
| Comparative Example 1 | 20 | 1 | 260.3 | 73.9 | 181 | 0.41 | 0.04 | 28 | Good | Good |
| Comparative Example 2 | 19 | 0 | 303 | 24.5 | 774.2 | 0.03 | 0.05 | 38 | Good | Good |
| Comparative Example 3 | — | — | — | — | — | — | — | — | — | — |
| Comparative Example 4 | 3 | 0.8 | 36 | 33 | 37 | 0.89 | 0.03 | — | Poor | — |

Orthogonal direction*: Direction orthogonal to the main shrinkage direction
Comparative Example 3*: Rupture occurred frequently during transverse stretching, and thus a film could not be obtained.

Example 8

By using a co-extrusion method, polyolefin resin was melt-extruded (laminated in a die and extruded) from two extruders (first and second extruders), and wound around a rotating metal roll cooled at 30° C. so as to be quenched, resulting in an unstretched film (polyolefin resin lamination sheet) of a two-type and three-layer structure with a thickness of 560 μm. The take-off speed (rotational speed of the metal roll) of the unstretched film at this time was about 6.8 m/min. A method (processes until melt extrusion) of forming each layer of the unstretched film was as follows. In the following description, the three layers are called a first layer, a second layer, and a third layer, respectively, in order from the surface layer of the polyolefin resin lamination sheet (namely, a surface of the third layer is a metal roll contact surface). The extruding amounts of the first and second extruders during formation of the unstretched film were adjusted such that the thicknesses ratio of first layer/second layer/third layer becomes 5/20/5.

Formation of First Layer and Third Layer (Skin Layer)

The above dried resin materials A, B, and C were continuously and individually fed to the hopper of the extruder (the first extruder) by a metering screw feeder. The fed amount of the resin material A was 90 mass %, the fed amount of the resin material B was 8 mass %, and the fed amount of the resin material C was 2 mass %. Then, the fed resin materials A, B, and C were mixed in the hopper, and melt-extruded from a T die at 250° C. by the uniaxial first extruder.

Formation of Second Layer (Core Layer)

The above dried resin material A was continuously fed to the hopper of the extruder (the second extruder) by a metering screw feeder. Then, the fed resin material A was melt-extruded from a T die at 250° C. by the uniaxial second extruder.

Thereafter, the resulting unstretched film was led to a tenter in which a transverse stretching zone, an intermediate zone, and an intermediate thermal relaxation treatment zone were continuously disposed. In the tenter, the length of the intermediate zone located intermediately between the transverse stretching zone and the intermediate thermal relaxation treatment zone was set at about 40 cm. Additionally, in the intermediate zone, when a strip of paper was hung down in a state where a film did not pass therethrough, hot air from the stretching zone and hot air from the thermal treatment zone were interrupted such that the paper strip hung down almost completely in the lengthwise direction.

Then, the unstretched film led to the tenter was preliminary heated until the temperature of the film became 90° C. Thereafter, the film was stretched to 6.5 times its original length at 90° C. in the transverse direction in the transverse stretching zone and passed through the intermediate zone. Then, the film was led to the intermediate thermal relaxation treatment zone and heat-treated at a temperature of 130° C. for 43 seconds, resulting in a transverse uniaxially stretched film with a thickness of 90 μm. Subsequently, one pair of trimming devices (including a round blade having a circular cutting edge) disposed on right and left sides behind the tenter were utilized to cut an edge area of the transverse uniaxially stretched film (portion with a thickness of about 1.2 times that of the center of the film) and to continuously remove the edge portions of the film positioned outside the cut portion.

Furthermore, the film (film width=500 mm) whose edge portions were trimmed in such a manner was led to a lengthwise stretching machine in which a plurality of roll groups were continuously arranged, and was preliminarily heated on a preheat roll until the film temperature became 90° C. Then, the film was stretched to 6.0 times its original length between a low-speed stretching roll set at a surface temperature of 90° C. and a high-speed stretching roll in which circulating water was set at a temperature of 30° C. The speed of the low-speed roll (the speed of the film moving together with the low-speed roll) was adjusted at 1.0 m/min, and the speed of high-speed roll (the speed of the film moving together with the high-speed roll) was adjusted at 6.0 m/min. The stretching gap between the low-speed stretching roll and the high-speed stretching roll (the distance from the contact point between the low-speed stretching roll and the film to the contact point between the high-speed stretching roll and the film) was adjusted at 116 mm. Thus, the stretching gap ratio was 0.23.

Then, the film after being stretched as described above was reeled around a paper tube, thereby obtaining a film roll in which a biaxially stretched film (heat-shrinkable polyolefin film) with a thickness of about 30 μm was wound for a predetermined length. Subsequently, the properties of the resulting film were evaluated by the methods as described above. The evaluation results are shown in Table 6.

Example 9

A film roll in which a heat-shrinkable film was wound was obtained by the same method as that of Example 8, except that the resin material for forming the core layer was changed to the resin material E. Then, the properties of the resulting film were evaluated by the same methods as that of Example 8. The evaluation results are shown in Table 6.

Example 10

A film roll in which a heat-shrinkable film was wound was obtained by the same method as that of Example 8, except that the speed of the low-speed roll during lengthwise stretching was changed to 1.5 m/min and the speed of the high-speed roll during lengthwise stretching was adjusted at 9.0 m/min (lengthwise stretching ratio=6.0 times). Then, the properties of the resulting film were evaluated by the same methods as that of Example 8. The evaluation results are shown in Table 6.

Example 11

A film roll in which a heat-shrinkable film was wound was obtained by the same method as that of Example 8, except that the speed of the low-speed roll during lengthwise stretching was changed to 2.0 m/min and the speed of the high-speed roll during lengthwise stretching was adjusted at 9.0 m/min (lengthwise stretching ratio=4.5 times). Then, the properties of the resulting film were evaluated by the same methods as that of Example 8. The evaluation results are shown in Table 6.

Example 12

A film roll in which a heat-shrinkable film was wound was obtained by the same method as that of Example 8, except that when an unstretched resin sheet was formed, the resin material fed to the second extruder was changed as described in Table 2 and a single-layer structure of only a second layer was provided without forming a first layer and a third layer. Then, the properties of the resulting film were evaluated by the same methods as that of Example 8. The evaluation results are shown in Table 6.

Comparative Example 5

A film roll in which a heat-shrinkable film was wound was obtained by leading an unstretched film obtained by the same method as that of Example 8 to the lengthwise stretching machine without performing the transverse stretching and the intermediate thermal relaxation treatment, and by lengthwise stretching the unstretched film by the same method as that of Example 8. Then, the properties of the resulting film were evaluated by the same methods as that of Example 8. The evaluation results are shown in Table 6.

Comparative Example 6

A film roll in which a heat-shrinkable film was wound was attempted to be obtained by the same method as that of Example 8, except that the resin materials for forming the skin layer and the core layer and their compositions were changed as described in Table 2. However, rupture occurred frequently during the transverse stretching process, and thus a film that could be evaluated could not be obtained.

Comparative Example 7

A film roll in which a heat-shrinkable film was wound was obtained by the same method as that of Example 8, except that the resin materials for forming the skin layer and the core layer and their compositions were changed as described in Table 2, the temperature for the intermediate thermal relaxation treatment was changed to 160° C., and the temperature of the low-speed roll during lengthwise stretching was changed to 140° C. Then, the properties of the resulting film were evaluated by the same methods as that of Example 8. The evaluation results are shown in Table 6.

Comparative Example 8

A film roll in which a heat-shrinkable film was wound was obtained by the same method as that of Example 8, except that the temperature of the high-speed roll during lengthwise stretching was changed to 120° C., the speed of the low-speed roll during lengthwise stretching was changed to 2.0 m/min, the speed of the high-speed roll during lengthwise stretching was adjusted at 8.0 m/min (lengthwise stretching ratio=4.0 times), and the stretching gap between the low-speed stretching roll and the high-speed stretching roll was adjusted at 30 mm (the stretching gap ratio was 0.06). Then, the properties of the resulting film were evaluated by the same methods as that of Example 8. The evaluation results are shown in Table 6.

TABLE 6

| | Properties of heat-shrinkable film | | | | | | |
|---|---|---|---|---|---|---|---|
| | 90° C. hot-water shrinkage ratio (%) | | Right angle tear strength (N/mm) | Elmendorf tear load (mN) | | Elmendorf ratio | Heat-resistant peel strength (N/15 mm) |
| | Main shrinkage direction | Orthogonal direction* | | Main shrinkage direction | Orthogonal direction* | | |
| Example 8 | 33 | 2.5 | 109.8 | 83.4 | 107.9 | 0.77 | 0.04 |
| Example 9 | 36 | 5.5 | 91.8 | 67.8 | 90.2 | 0.75 | 0.04 |
| Example 10 | 32 | 2 | 132.7 | 68.6 | 107.8 | 0.72 | 0.05 |
| Example 11 | 24 | 3 | 149.5 | 120.9 | 153.5 | 0.79 | 0.05 |
| Example 12 | 30 | 2.4 | 90.8 | 75.1 | 96.2 | 0.78 | 0.04 |
| Comparative Example 5 | 19 | 0 | 303 | 24.5 | 774.2 | 0.03 | 0.05 |
| Comparative Example 6 | — | — | — | — | — | — | — |
| Comparative Example 7 | 3.8 | 0.8 | 34 | 29 | 33 | 0.88 | 0.03 |
| Comparative Example 8 | 31 | 10.3 | 165.7 | 156.9 | 150.4 | 1.04 | 0.04 |

| | Properties of heat-shrinkable film | | | | | | | | | | | |
|---|---|---|---|---|---|---|---|---|---|---|---|---|
| | 60-80° C. hot-water shrinkage ratio (%) Main: main shrinkage direction, Or.: orthogonal direction | | | | | | | | | | Perforated line openability (failure ratio) (%) | Shrinkage unevenness | Thermal blocking resistance |
| | 60° C. | | 65° C. | | 70° C. | | 75° C. | | 80° C. | | | | |
| | Main | Or. | Main | Or. | Main | Or. | Main | Or. | Main | Or. | | | |
| Example 8 | 4 | −2 | 7.5 | −2.5 | 11.5 | −3 | 15.5 | −2.5 | 20 | −1.5 | 4 | Excellent | Good |
| Example 9 | 4 | −0.5 | 8 | −1 | 14 | −1.5 | 19 | −1 | 25 | −0.1 | 6 | Excellent | Good |
| Example 10 | 3.5 | −2 | 7.5 | −2.5 | 11 | −2.5 | 15 | −2.5 | 19 | −1.5 | 6 | Excellent | Good |
| Example 11 | 2 | −0.5 | 5.5 | −1 | 8.5 | −1.5 | 12 | −1.5 | 15 | −0.5 | 4 | Excellent | Good |
| Example 12 | 3 | −2 | 7 | −2.5 | 10 | −2.5 | 14 | −2.5 | 19 | −1.5 | 4 | Excellent | Good |
| Comparative Example 5 | 1 | 0 | 4 | 0 | 6 | 0 | 8.5 | 0 | 11 | 0 | 38 | Good | Good |
| Comparative Example 6 | — | — | — | — | — | — | — | — | — | — | — | — | — |
| Comparative Example 7 | 0 | 0 | 0.5 | 0.1 | 1 | 0.2 | 1.5 | 0.3 | 1.9 | 0.5 | — | Poor | — |
| Comparative Example 8 | 2.5 | 1 | 6.8 | 2.8 | 10.5 | 4 | 14.3 | 5.5 | 19.5 | 7.8 | 6 | Poor | Good |

Orthogonal direction*: Direction orthogonal to the main shrinkage direction
Comparative Example 2*: Rupture occurred frequently during transverse stretching, and thus a film could not be obtained.

As is obvious from Tables 5 and 6, the films obtained in Examples 1 to 12 were all high in shrinkability in the longitudinal direction that is the main shrinkage direction and very low in shrinkability in the width direction orthogonal to the main shrinkage direction. In addition, the films obtained in Examples 1 to 12 were all low in heat-resistant peel strength, had no shrinkage unevenness, and were excellent in finish properties after shrinkage, perforated line openability, and thermal blocking resistance. Therefore the heat-shrinkable polyolefin films obtained in Examples were all high in quality as a label and extremely high in practicality.

On the other hand, the heat-shrinkable films obtained in Comparative Examples 1 and 2 were poor in perforated line openability. Under the conditions of Comparative Example 3, a film that could be evaluated could not be obtained. In addition, the film obtained in Comparative Example 4 was extremely low in heat shrinkage ratio in the longitudinal direction, and could not be successfully attached as a label due to its insufficient shrinkage. Thus, a bottle with a label that could be evaluated for perforated line openability and thermal blocking resistance could not be obtained. Therefore the heat-shrinkable polyolefin films obtained in Comparative Examples 1 to 4 were all poor in quality as a label and low in practicality.

Further, the heat-shrinkable film obtained in Comparative Example 5 was insufficient in heat shrinkage ratio, and shrinkage unevenness occurred when attached as a label. In addition, the film was poor in perforated line openability and thermal blocking resistance. Under the conditions of Comparative Example 6, a film that could be evaluated could not be obtained. The film obtained in Comparative Example 7 was extremely low in heat shrinkage ratio in the longitudinal direction, and could not be successfully attached as a label due to its insufficient shrinkage. Thus, a bottle with a label that could be evaluated for perforated line openability and thermal blocking resistance could not be obtained. The film obtained in Comparative Example 8 was good in heat shrinkage ratio in the longitudinal direction, shrinkage unevenness, perforated line openability, and thermal blocking resistance, but was high in shrinkage ratio in the orthogonal direction and caused great vertical shrinkage. Therefore the heat-shrinkable polyolefin films obtained in Comparative Example 5 to 8 were all poor in quality as a label and low in practicality.

INDUSTRIAL APPLICABILITY

The heat-shrinkable polyester film of the present invention has excellent processing properties as described above, and thus can be suitably used for label applications for bottles.

DESCRIPTION OF THE SYMBOL

F . . . film

The invention claimed is:

1. A heat-shrinkable polyolefin film formed in an elongated shape with a constant width from a polyolefin resin including a copolymer of propylene and ethylene as a principal component, a main shrinkage direction thereof being in a longitudinal direction,
wherein
the heat-shrinkable polyolefin film has a laminate structure in which a skin layer is laminated on each of both surfaces of a core layer,
the total thickness of the film is 10 to 200 μm,
the amount of ethylene in the polyolefin resin is 2.0 mass % or more and 10 mass % or less, and
the heat-shrinkable polyolefin film meets the following requirements (1) to (4):
(1) the hot-water heat shrinkage ratio in the longitudinal direction is 15% or more and 40% or less when the film is treated in hot water at 90° C. for 10 seconds;
(2) the hot-water heat shrinkage ratio in a width direction orthogonal to the longitudinal direction is −5% or more and 10% or less when the film is treated in hot water at 90° C. for 10 seconds;
(3) the right angle tear strength in the width direction per unit thickness after the film is shrunk by 10% in the longitudinal direction in hot water at 80° C. is 50 N/mm or more and 200 N/mm or less; and
(4) the peel strength is 0.1 N/15 mm or less when surfaces of two of the films are joined and a pressure of 0.4 MPa is applied to the films for 90 seconds while the films are heated at 90° C.

2. The heat-shrinkable polyolefin film according to claim 1, wherein the film meets the following requirement (5):
(5) the hot-water heat shrinkage ratio at a treatment temperature of 60° C. to 80° C. is 0% or less when the hot-water heat shrinkage ratio in the width direction is measured after the film is treated in hot water at a predetermined temperature for 10 seconds.

3. The heat-shrinkable polyolefin film of claim 2, wherein:
an anti-blocking agent and/or an antistatic agent are added in at least one skin layer.

4. A method for manufacturing a heat-shrinkable polyolefin film of claim 2, the method comprising the steps of:
stretching an unstretched film at a ratio of 2.5 times or more and 8.0 times or less in the width direction at a temperature of 70° C. or higher and 140° C. or lower while holding both ends of the film in the width direction using clips within a tenter;
performing a thermal relaxation treatment for the film at a temperature of 100° C. or higher and 155° C. or lower for a time period of 1.0 second or longer and 50.0 seconds or shorter;
cutting and removing portions of the film at both ends in the width direction which are held by the clips; and
stretching the film at a ratio of 2.0 times or more and 8.0 times or less in the longitudinal direction at a temperature of 70° C. or higher and 140° C. or lower.

5. The method according to claim 4, wherein:
the stretching in the longitudinal direction is performed between a heated low-speed roll and a high-speed roll; and
the ratio of the stretching gap between these two rolls and the film width before stretching is adjusted so as to be 0.10 or more and 0.50 or less.

6. The heat-shrinkable polyolefin film of claim 1, wherein:
an anti-blocking agent and/or an antistatic agent are added in at least one skin layer.

7. A method for manufacturing a heat-shrinkable polyolefin film of claim 1, the method comprising the steps of:
stretching an unstretched film at a ratio of 2.5 times or more and 8.0 times or less in the width direction at a temperature of 70° C. or higher and 140° C. or lower while holding both ends of the film in the width direction using clips within a tenter;
performing a thermal relaxation treatment for the film at a temperature of 100° C. or higher and 155° C. or lower for a time period of 1.0 second or longer and 50.0 seconds or shorter;
cutting and removing portions of the film at both ends in the width direction which are held by the clips; and stretching the film at a ratio of 2.0 times or more and 8.0 times or less in the longitudinal direction at a temperature of 70° C. or higher and 140° C. or lower.

8. The method according to claim 7, wherein:

the stretching in the longitudinal direction is performed between a heated low-speed roll and a high-speed roll; and the ratio of the stretching gap between these two rolls and the film width before stretching is adjusted so as to be 0.10 or more and 0.50 or less.

* * * * *